United States Patent [19]

Hatton

[11] Patent Number: 5,059,577

[45] Date of Patent: Oct. 22, 1991

[54] FLUID ABSORBENT COMPOSITION

[76] Inventor: John H. Hatton, 567 S. Sierra Ave., No. 90, Solana Beach, Calif. 92075

[21] Appl. No.: 906,813

[22] Filed: Sep. 12, 1986

[51] Int. Cl.$^5$ .............................................. B01J 20/24
[52] U.S. Cl. ....................................... 502/404; 134/6; 208/188; 502/401; 502/403
[58] Field of Search ................... 502/401, 403, 404; 134/6; 208/188

[56] References Cited

U.S. PATENT DOCUMENTS

| | | | |
|---|---|---|---|
| 1,728,656 | 9/1929 | Brandley | 502/404 |
| 2,264,654 | 12/1941 | Boyd | 502/401 X |
| 2,269,315 | 1/1942 | Nelson et al. | 502/401 X |
| 3,442,819 | 5/1969 | Herbert | 502/404 X |
| 3,527,712 | 9/1970 | Renn et al. | 502/401 X |
| 3,591,524 | 7/1971 | Eriksen | 502/404 X |
| 3,791,990 | 2/1974 | Fischer | 502/401 X |
| 4,006,094 | 2/1977 | Pellar | 502/401 X |
| 4,021,368 | 5/1977 | Nemec et al. | 502/403 |
| 4,199,472 | 4/1980 | Ohtsuka et al. | 502/404 |
| 4,345,973 | 8/1982 | Ladisch et al. | 502/404 X |
| 4,525,465 | 6/1985 | Someno et al. | 502/404 X |
| 4,576,928 | 3/1986 | Tani et al. | 502/404 |

FOREIGN PATENT DOCUMENTS

| | | | |
|---|---|---|---|
| 59-76538 | 12/1970 | Canada | 502/404 |
| 10859083 | 12/1970 | Canada | 502/401 |
| 0180563 | 5/1986 | European Pat. Off. | 502/401 |
| 8023785 | 7/1978 | Japan | 502/404 |
| 55-18239 | 8/1980 | Japan | 502/401 |
| 55-159837 | 12/1980 | Japan | 502/401 |
| 9076539 | 5/1984 | Japan | 502/403 |
| 61-74642 | 4/1986 | Japan | 502/404 |

*Primary Examiner*—Asok Pal
*Attorney, Agent, or Firm*—Baker, Maxham, Jester & Meador

[57] ABSTRACT

A composition for absorbing liquids comprises an organic material derived from at least one substance selected from the group consisting of plant gums and plant mucilages. The absorbing compositions are applied as powders, pastes, or sheets.

4 Claims, 1 Drawing Sheet

FLUID ABSORBENT COMPOSITION

BACKGROUND OF THE INVENTION

The present invention relates to compositions for the absorption of liquids and methods of use, and pertains particularly to specific materials and methods for the removal of liquids from a supporting medium by the process of absorption.

There are many situations where it is desirable to have suitable materials and methods for the removal of certain liquids, such as oils, greases, acids and the like from surfaces for cleanup purposes. It is also desirable to have absorptive materials that will draw fluids, liquids and residues, such as stains and the like from support surfaces, such as concrete, wood and the like.

Many materials have been proposed for cleaning oil and grease stains from concrete driveways and the like. Many of the materials presently in use include clays and other soils which act to absorb the oils and the like. These materials, however, have not been entirely satisfactory.

Absorbent materials are also desirable for many other uses. Such materials may be useful, for example, for separation of one liquid from another, for storing a liquid, or for combining a liquid or materials contained therein with another material.

Accordingly, it is desirable that an improved absorbent material and method be available.

SUMMARY AND OBJECTS OF THE INVENTION

It is the primary object of the present invention to provide an improved method and material for absorption of liquids and the like.

In accordance with a primary aspect of the present invention, an absorbing composition comprises a quantity of organic material derived from plant gums and/or plant mucilages in admixture with a quantity of fibrous material. In use, a quantity of the absorbing composition is placed in contact with the liquid substance to be removed.

BRIEF DESCRIPTION OF THE DRAWING

The above and other objects and advantages of the present invention will become apparent from the following description when read in conjunction with the accompanying drawing wherein.

DETAILED DESCRIPTION OF A PREFERRED EMBODIMENT

Figure 1:
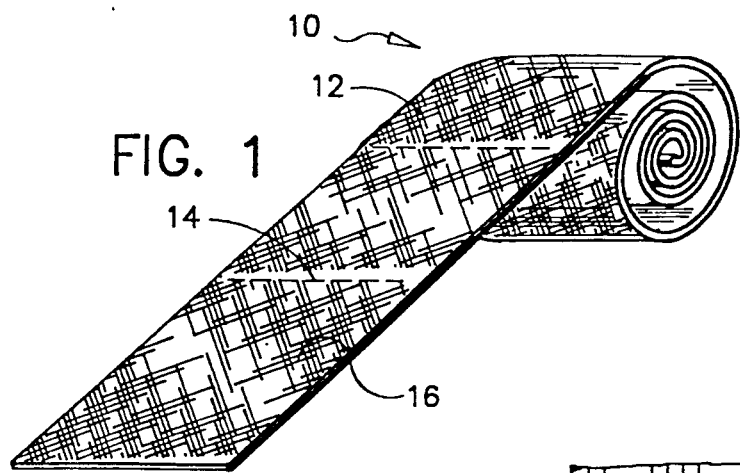
FIG. 1 is a perspective view showing a preferred embodiment of the invention.

The removal of oils and greases from garage floors and driveways has been an enormous problem for many years. The present invention was conceived and developed to remove certain materials such as oils and greases from concrete and other similar surfaces. It is based on the discovery that certain adhesives and mixtures containing these adhesives are highly absorbent.

Many plants produce gums and mucilages that are useful and have been used in the past as adhesives. Gums and mucilages are carbohydrate polymers of high molecular weight obtained from these plants.

Gums are the dried exudates from trees and shrubs produced with or without artificial stimulation by mechanical injury. Among the gums of commercial value are arabic, ghatti, karaya, and tragacanth. Some gums are completely soluable in water and others swell but do not dissolve. Still other gums exist which have two components, one of which dissolves completely while the other swells.

Plant mucilages are obtained from seeds, roots or other parts of plants by extraction with either hot or cold water. While gums form tacky or sticky solutions, mucilages give slippery or mucilaginous solutions, e.g., those from guar bean, linseed, locust bean and other related leguminous plant seeds.

The so-called sea weed mucilages or gums such as agar, algin and carrageenin, referred to as algal polysacchrides, are obtained from various salt water algaes. One refined seaweed extract of commercial importance is sodium alginate. Gum-like polysacchrides belonging to the hemicellulose group of carbohydrate polymers have been isolated from grains such as wheat, barley, rye, oats and maize.

The invention, in its preferred form, comprises a composition containing a quantity of from about one percent up to one-hundred percent of an organic material selected from mucilaginous and gum materials in granular or powdered form. One form of preferred material is ground psyllium husks, which is the coating of Plantago psyllium seeds. Another preferred material is vegetable gums, such as guar, gum arabic and those discussed above. Other suitable materials may be obtained from seaweeds such as marine algae or kelp as further discussed above.

Other materials having similar characteristics as those discussed above, which are suitable for use in the present invention, are polysaccharides from corn, potatoes, wheat, rice, and the like.

The above described materials may be used alone or in various mixtures and combinations. Such materials can also be mixed with various organic fibers or particles. Mixtures or blends of the mucilaginous/gum materials with certain fibers or particles, such as wood fibers, wood pulp, paper pulp, recycled paper, bagasse, grasses, rice hulls, cornhusks, and other plant fibers, afford useful compositions for absorption applications. The fibrous material is helpful in combination with the mucilaginous and/or gum material in that it acts as a binder for the adhesive to form mat-like structures, which have advantages as will be described. The absorbing compositions of the invention can be formed into mat form or into pastes and applied as will be described.

Ground Plantago psyllium husks and guar gum seeds are available from commercial suppliers who obtain them from certain Mid-Eastern countries. Ground psyllium husks have been used as an ingredient in certain foods and medications, such as Metamucil for example. Many of the mucilaginous and gum materials are highly hydrophilic and expand from twelve to twenty fold when mixed with water. In the present invention, these expanding materials have been found to have particular application drawing a liquid, such as oil, out of a material such as concrete.

Experiments carried out with ground Plantago psyllium husks, ground guar beans and gum powders have demonstrated the capability of these materials to absorb and extract oil and other liquids and stains from concrete, asphalt and the like. The absorbing material can be used in pure finely ground or powder form or in various combinations with other powders and fibers as will be described.

EXAMPLE 1

Ground Plantago psyllium husk powder was applied over a patch of oil on a concrete surface. After several hours, it was observed that the oil from the concrete surface had been drawn into the powder. It was also observed that the powder could be handled without staining the hands, indicating that the oil had been absorbed by the powder.

EXAMPLE 2

A powder of ground guar seed was applied to a patch of concrete, as in the previous example. The results were similar to those obtained in the previous example with the powder absorbing the oil from the concrete surface, which was left clean and free of any oily residue.

Similar applications have been made to asphalt surfaces with the powder removing oil patches from such surfaces.

EXAMPLE 3

A small quantity of oil was poured on the surface of a body of water. A quantity of ground Plantago psyllium husk in powder form was applied to cover the floating oil. The psyllium husk powder was observed to completely absorb the oil in a short period of time. A similar experiment was conducted with ground guar seeds in a powder form with the same results.

EXAMPLE 4

A mixture of psyllium husk powder and paper mulch was prepared. The paper mulch was waste paper in the form of newsprint that had been ground in a hammer mill to a fine fiber. The mixture in one embodiment comprised approximately twenty percent by weight of psyllium husk powder. This mixture was placed over an oil patch on a cement floor. The material was left to soak up the oil for a period of a few hours. Upon removal of the material, the oil was observed to have been completely removed from the concrete surface.

Other similar experiments have been carried out wherein the absorbing compositions contained only about five percent psyllium husk powder. These compositions were also found to be successful in removing surface oil from the surfaces of concrete surfaces and the like.

Other successful experiments have also been carried out using mixtures of psyllium husk powder and gum powder mixed in various proportions and in combinations with a fibrous material.

Studies indicate that the greater the percentage of mucilaginous and/or gum powder material, the greater the drawing power of the composition with respect to oils, stains and the like from within concrete or other similar structures.

Mixtures similar to those described above have been placed on oil stained concrete slabs with the material then being wetted by water and allowed to stand for several days. The material which was then removed by means of a putty knife came up as a skin. This method was successful in removing surface stains as well as stains from within concrete.

The materials described above and various mixtures thereof may be formed into a paste by the addition of water or the like and applied to various surfaces for the removal or capture of oils and other liquids. For example, a paste of the material may be placed around leaking pipes or pipe joints to absorb oil leaks.

Referring to FIG. 1 of the drawing, there is illustrated a physical embodiment with the materials of the present invention formed, for example, into thin sheets that may be used as will be described. As shown in FIG. 1, the roll designated generally by the numeral 10 comprises an elongated continuous sheet 12 of material composed of a composition of one or more of the mucilaginous or gum materials and a fibrous material mixed and wetted with water, for example, to form a continuous mat. The sheet is preferably scored, such as by perforations or the like 14, to enable it to be separated into discrete sheets 16, for example.

Figure 2:
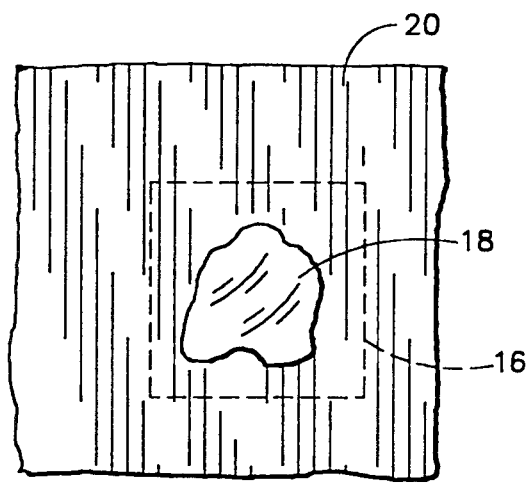
FIG. 2 is a top plan view showing an application of the embodiment of FIG. 1.

The sheets 16 may be separated from the roll and may be placed over an oil spill or spot 18 on the surface of a slab 20, as shown in FIG. 2, for example. The sheet 16 may be placed as shown by the broken line outline 16 over the oil spot or spill 18. The mat thus utilized may cover and absorb the oil spot.

Figure 3:
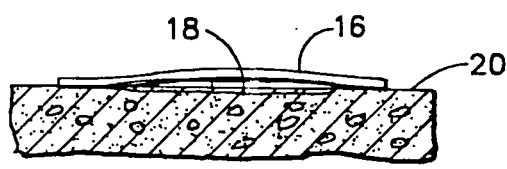
FIG. 3 is a side elevation view, in section, showing a further stage in the application of FIG. 2.

In a similar manner as will be observed in FIG. 3, the mat may be placed in or underneath machinery, automobile engines and the like to catch drippings from the engine and/or transmission. Thus, the mats may be fabricated into sheets as thin as one-eighth inch or as thick as one to two inches for various purposes. The sheets may be utilized as protective covers for placement on the floors in garages and the like. When the sheet becomes overly saturated, at least in portions, it may be removed and replaced. It is also contemplated that the materials may be recycled in some manner by removal and recovery of the oil therein.

Figure 4:
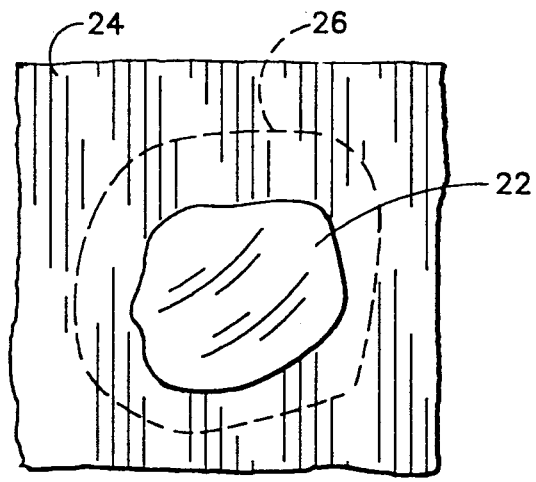
FIG. 4 is a view like FIG. 2 showing an alternate application.
Figure 5:
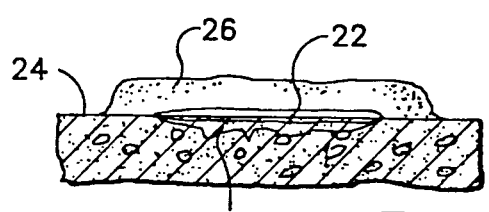
FIG. 5 is a view like FIG. 3 showing an alternate embodiment and further stage of application.

Referring to FIGS. 4 and 5, there is illustrated an example of the utilization of the absorbing materials described herein as a paste. Referring to FIG. 4 for example, an oil or other liquid spot or puddle 22 is shown on a surface 24 of concrete or the like. A quantity of the absorbing material, as described above, is selected and formed, for example, into a paste and then spread, as shown in FIG. 5, in a layer 26 over the oil spot. The material covers an area, as shown for example in FIG. 4, by the dotted or broken line. Shown below the surface of the slab or block 24 is a stain portion of the oil or liquid puddle 22, which has seeped into the pores of the slab 24. The paste 26 will function to draw out and absorb the liquid material 24 on the surface of the slab 24 and also the stain material 22' beneath the slab surface.

While I have illustrated and described my invention by means of numerous examples and specific embodiments, it is to be understood that numerous modifications and changes may be made therein without departing from the spirit and scope of the invention as defined in the appended claims.

I claim:

1. A synthetic composition for absorbing a liquid, such as oils and the like for clean up purposes, said composition consisting of ground Plantago psyllium husks mixed with ground newsprint.

2. A composition for absorbing a liquid, said composition consisting essentially of ground Plantago psyllium husks mixed with ground newsprint.

3. A composition according to claim 2, wherein said composition is further modified by a process of adding a quantity of water, arranging said composition in the form of a sheet and removing said water.

4. A composition according to claim 2 wherein said composition is further modified by adding a quantity of water and arranging said composition into the form of a paste.

* * * * *